Dec. 23, 1952     C. B. STADUM ET AL     2,623,168
HEAT CONTROL CIRCUIT
Filed March 17, 1950     2 SHEETS—SHEET 1
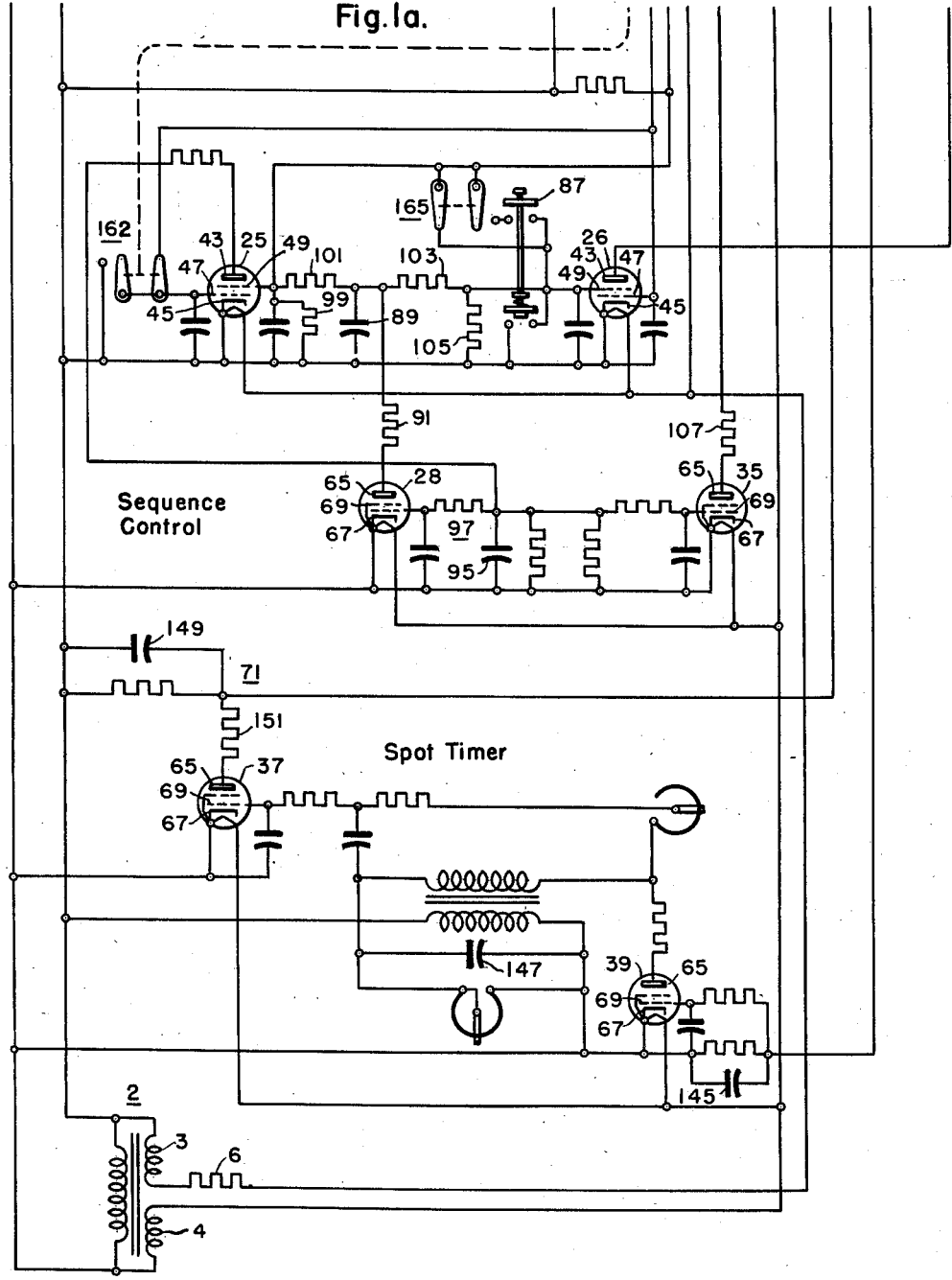
INVENTORS
Edward C. Hartwig, Clarence B. Stadum
and William E. Large.
ATTORNEY

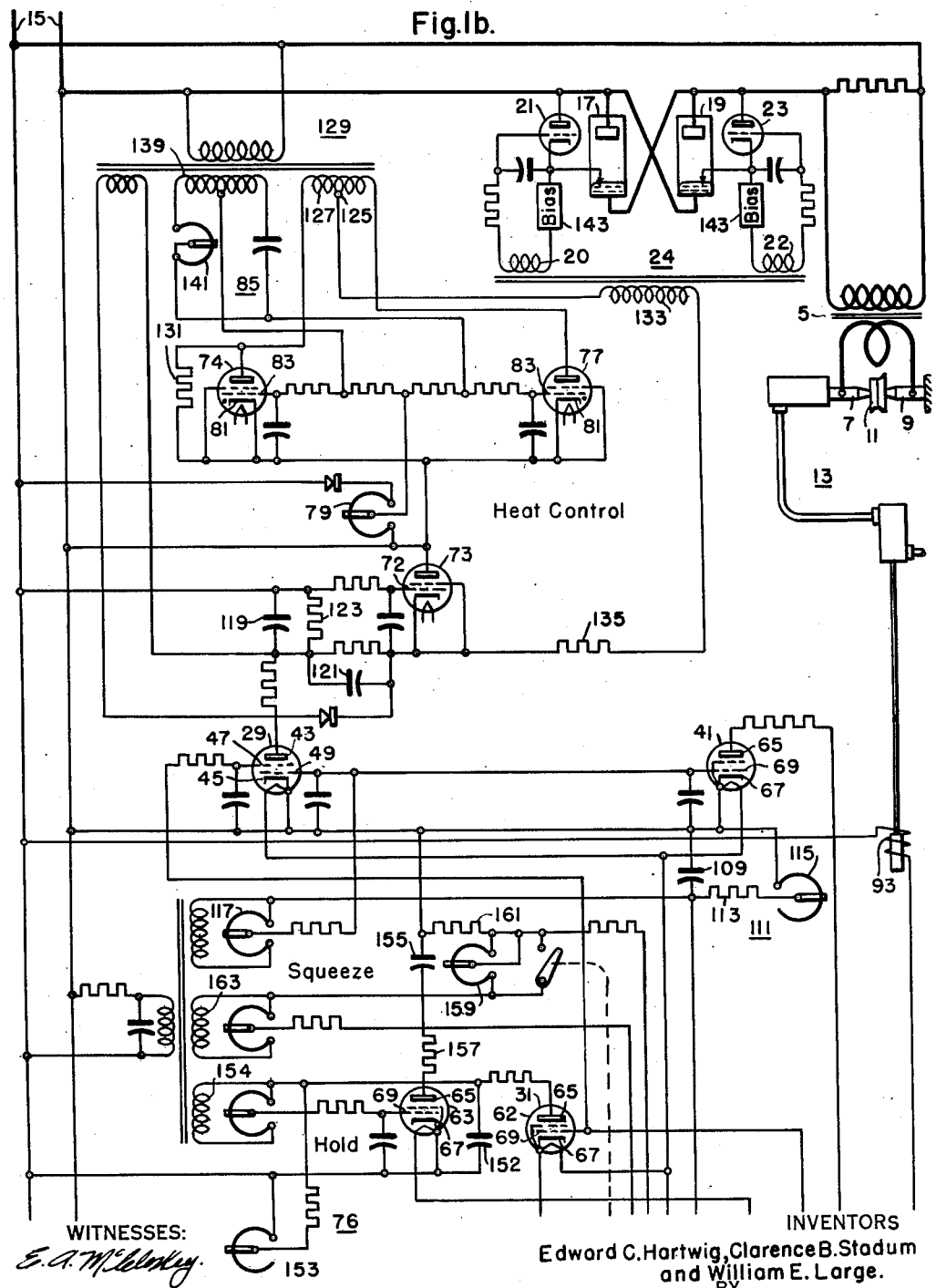

Patented Dec. 23, 1952

2,623,168

UNITED STATES PATENT OFFICE 2,623,168

HEAT CONTROL CIRCUIT

Clarence B. Stadum, Snyder, and Edward C. Hartwig and William E. Large, Lancaster, N. Y., assignors to Westinghouse Electric Corporation, East Pittsburgh, Pa., a corporation of Pennsylvania Application March 17, 1950, Serial No. 150,238

14 Claims. (Cl. 250—27)

1

Our invention relates to electric discharge apparatus and it has particular relation to apparatus for controlling the current flow during a predetermined period.

Our invention has particular application to resistance welding. A resistance welding operation is initiated by the closing of a start switch. After the switch is closed, the electrodes are engaged with the work under pressure. This event takes place during a time interval of proper length called the Squeeze interval. Following the Squeeze interval, the flow of welding current takes place during an interval which is called the Weld interval. When the flow of welding current is interrupted, the welding electrodes are maintained in engagement with the material during a so-called Hold interval until the weld hardens. The electrodes are then disengaged from the material and maintained in disengagement during a so-called Off interval so that the material may be reset for a second operation. If the welder is set for Repeat operation and the start switch is maintained closed, the above-described sequence of events is repeated a number of times and a series of welds are produced. If the welding is set for Non-Repeat operation, the start switch must be reopened and reclosed after the completion of each Hold interval.

A heat control circuit is used to control the flow of current during the Weld interval. An example of a heat control circuit is shown in Patent 2,248,968 filed August 13, 1938, to J. W. Dawson. In this circuit, the valve 61 is connected to rectifier circuit 93 in such a manner that it has impressed between its anode and cathode a direct current voltage. The current flowing through the valve 61 controls the conductivity of the heat control circuit. The requirement that a source of direct current be used with the valve 61 seriously limited the usefulness of the Dawson circuit.

For reasons of simplicity, sequence timers employ a plurality of valves connected to the conventional 115 voltage power source. Such circuits of which the Hartwig Patent No. 2,533,369 is an example, rectify the current flowing through the 115 volt line to provide a pulsating unidirectional current during each of the time intervals. The Dawson circuit is not applicable in combination with such a timer since Dawson relies on the use of a substantially constant current flowing through the valve 61.

It is, accordingly, an object of our invention to provide a heat control circuit in which the flow of current is controlled by current flowing

2 through a half wave rectifier connected to a source of alternating current.

It is another object of our invention to provide a heat control circuit in which the flow of current can be controlled with accuracy.

It is another object of our invention to provide a heat control circuit having a minimum of circuit components.

In accordance with our invention, we provide a heat control tube having a capacitor connected between its control electrode and its cathode. The capacitor is charged at the beginning of the weld interval through a half wave rectifier. The heat control tube is connected to a control transformer through a plurality of resistors. These resistors normally limit the flow of current to such an extent that the ignitrons of the power circuit do not become conductive. Two valves are connected to shunt these resistors. A variable phase shift circuit controls the conductivity of these two shunt valves. A variable D. C. bias, connected between the cathodes and grids of the two shunt valves, further controls their conductivity. Such a heat control circuit has a number of variable control elements and can be used with the conventional half wave rectifier sequence timer.

The novel features which we consider characteristic of our invention are set forth with particularity in the appended claims. The invention itself, however, both as to its organization and method of operation together with additional objects and advantages thereof will best be understood from the following description of a specific embodiment when read in connection with the attached drawings, Figs. 1a and 1b, which form two parts of a circuit diagram showing a preferred embodiment of our invention.

The apparatus shown in the drawings comprises a welding transformer 5 across the secondary of which welding electrodes 7 and 9 are connected. One of these electrodes 7 may be moved into and out of engagement with the work 11 by operation of a hydraulic system 13. Power is supplied to the primary of the transformer 5 from buses 15, which may be the buses of a commercial supply of 200 to 2300 nominal voltage rating, through a pair of ignitrons 17 and 19 connected in antiparallel between the buses and the primary. Firing thyratrons 21 and 23 respectively are provided for the ignitrons 17 and 19. These thyratrons become conductive in response to impulses from the secondaries 20 and 22 of the firing transformer 24.

The operation of the welding electrodes 7 and 9 and the supply of welding current is controlled from a sequence timer devoid of sequencing electromagnetic relays. This timer determines the duration and the order of occurrence of the Squeeze, Weld, Hold and Off intervals. It includes initiating thyratrons 35, 37, 39 and 41 respectively. The Squeeze thyratron 29 and two of the start thyratrons 26 and 25 are necessarily of the type having an anode 43; a cathode 45 and a plurality of control electrodes 47 and 49; and others may be of the same type but may be as shown of the type having an anode 65, a cathode 67 and only one control electrode 69. While the valves 29, 31, 35, 37, 39 and 41 are thyratrons in the preferred practice of our invention, certain or all of the valves may, under some circumstances, be high vacuum electric discharge devices, ignitrons or discharge devices of other types.

Between the control electrodes 69 and the cathodes 67 of the Weld thyratron 31 and the Hold thyratron 63 are connected the Weld and Hold time constants networks 71 and 76, respectively. Between the control electrodes and cathodes of the Squeeze, Hold and Start thyratrons 29, 33, 25 and 26 is a potentiometer and a transformer secondary. The voltage in the primary of these transformers is phase shifted so that the voltage peak through the secondary comes early in the positive half cycle between the anode and cathode of the Squeeze, Hold and Start thyratrons. The thyratron 29 is connected to the control grid 72 of the heat control thyratron 73 to bias it to conductivity during the weld interval. Two auxiliary heat control thyratrons 74 and 77 are connected in series with the heat control thyratron 73. A variable D. C. bias 79 is connected between the cathode 81 and the control grids 83 of the auxiliary thyratrons 74 and 77. A transformer variable phase shifter 85 provides a firing voltage. The heat control circuit is coupled through a transformer 24 to the thyratrons 21 and 23 which fire the welding ignitrons 17 and 19.

The valves of the sequence timer have cathodes heated by power from the heating transformer 2. The heating transformer has two secondaries 3 and 4. The first secondary 4 is connected directly to the heater elements, while the second secondary 3 is connected through a resistor 6 to other heater elements.

The first secondary 4 provides heating current for the thyratrons 37, 39, 35, 28 and 33 which are initially conductive. The second secondary 3 is connected to the thyratrons 26, 25, 31, 41, and 29 which must not be initially conductive.

The windings of the transformer 2 are such that the first secondary 4 impresses rated voltage on the heater connections. The second secondary 3 impresses rated voltage on the heater only when rated current is flowing. When the heater circuit is first closed, all the heaters take more than rated current. The first secondary 4 still impresses rated voltage on the heater, but a portion of the voltage impressed by the second secondary 3 appears across the resistor 6. The heaters of the thyratrons connected to the second secondary 3, then, are subject to less than rated voltage. The thyratrons on which rated voltage is impressed will heat up faster than those connected to the second secondary 3 and become conductive first. By means of this circuit arrangement, the thyratrons which are required to be initially conductive will heat up and become conductive first. The arrangement of the timer circuit is such that proper operation follows if the correct thyratrons are initially conductive.

To initiate operation of the circuit, the start switch 87 is closed. Prior to closure of the start switch 87, an auxiliary thyratron 28 is conducting current to charge the bias capacitor 89 through a resistor 91. The charge on the capacitor 89 normally maintains the start tubes 25 and 26 non-conductive. Closure of the start switch 87 connects the grids 49 of tubes 25 and 26 to their cathodes 45, thus initiating conduction through them. Current conducted through the first start tube 26 actuates the solenoid 93 of the hydraulic mechanism 13 to close the welding electrodes on the work piece. Current conducted by the second start tube 25 charges the capacitor 95 of the time constant circuit 97 associated with the auxiliary tube 28. The capacitor 95, when charged, causes the potential of the grid 69 of the auxiliary thyratron 28 to become negative with respect to the cathode 67 and the auxiliary thyratron 28 become non-conductive.

The value of the resistors 99, 101, 103, 105 is so chosen that the potential impressed across the timing capacitor 89 when the auxiliary tube is conductive is approximately 28 volts R. M. S. A transformer is used to supply 115 volts for control. Thus the start switch 87 closes a circuit across which is impressed approximately 28 volts instead of the usual 115 volts impressed across the start switch in conventional circuits.

The secondary auxiliary thyratron 35 becomes conductive when the first auxiliary thyratron 28 becomes conductive. Prior to initiation of operation of the sequence timer, the second auxiliary thyratron 35 has been conductive, charging through a resistor 107 the timing capacitor 109 of the Squeeze time constant circuit 111. When the second auxiliary thyratron 35 becomes non-conductive, the Squeeze time capacitor 109 discharges through the resistor 113 and the potentiometer 115. The potentiometer 115 can be varied to vary the time constant of this network 111 and, accordingly, the Squeeze time.

After a period of time determined by the setting of the potentiometer 115, the bias presented by the time contact network 111 is sufficiently low that the voltage across a portion of potentiometer 117 causes the auxiliary thyratron 41 to become conductive early in the positive half cycle of voltage between its anode 65 and cathode 67. The control grid of the squeeze thyratron 29 is connected to the same timing circuit 111. The thyratron 29, therefore, becomes conductive when the thyratron 41 becomes conductive. The thyratron 29, when conductive, charges the capacitor 119 in the grid circuit of the heat control thyratron 73. The voltage across capacitor 119 is added to the voltage across the biasing capacitor 121 to cause the heat control tube 73 to become conductive. The resistor 123 in parallel with capacitor 119 is of such value that the capacitor 119 retains its charge long enough to cause the tube 73 to conduct two pulses of current during every cycle of the control voltage.

Impressed across the heat control thyratron 73 is the voltage between the midtap 125 and one end of the secondary 127 of the transformer 129. During one half cycle of the supply the heat control thyratron 73 conducts electron current through the resistor 131, a portion of the secondary 127, the primary 133 of the firing transformer 24, the current limiting resistor 135 to the heat control thyratron 73. The current flowing through transformer primary 133 is insufficient to provide a firing pulse to the firing tubes. The thyratrons 74 and 77 are held nonconductive by voltage impressed by a phase shift circuit 85 connected to another secondary 139 of transformer 129 and the constant negative bias impressed across the heat control potentiometer 79. The variable direct-current voltage impressed between the cathodes 81 and control grids 83 controls the bias of thyratrons 74 and 77 and thereby varies the point in the cycle at which the thyratrons 74 and 77 fire. A portion of the control is provided by the potentiometer 141 in the phase shift circuit 85. The potentiometer 141 determines the phase of the alternating current impressed on the grids 83 of tubes 74 and 77. When the phase shift circuit 85 causes thyratrons 74 and 77 to be conductive during the positive half cycles between their anodes and cathodes, the resistor 131 is effectively short-circuited and a greater current is conducted through the primary 133 of the firing transformer 24.

The voltage impressed across the secondaries 20 and 22 of the transformer 24 adds to the bias 143 causing the firing tubes 21 and 22 to become conductive, firing the ignitrons 17 and 19 and initiating the flow of welding current.

Thus the direct-current voltage impressed across the potentiometer 79 and the setting of the phase shift potentiometer 141 determine the points in the voltage wave at which the tubes 74 and 77 become conductive. The phasing of the conduction of tubes 74 and 77 in turn determines the part of the cycle in which a firing pulse is transmitted from transformer 24 to the grids of the firing tubes 21 and 23 and, therefore, determines the point in the cycle at which the ignitrons 17 and 19 become conductive. The point at which the ignitrons 17 and 19 becomes conductive determines the weld current which flows through the welding electrodes.

Returning to the sequence timer, the grid of the auxiliary thyratron 41 is connected to the first control grid of the auxiliary thyratron 29. When the thyratron 29 becomes conductive to start welding current, the thyratron 41 becomes conductive, charging the capacitor 145 in a time constant circuit which is connected to the grid of auxiliary thyratron 39. The thyratron 39, which is initially conductive to charge the capacitor 147, becomes non-conductive. When fully charged, capacitor 147 biases thyratron 37 to non-conductivity. At the end of a predetermined time after thyratron 39 becomes non-conductive, the capacitor 147 discharges sufficiently to allow thyratron 37 to become conductive. The time constant circuit including capacitor 147 determines the Weld time. Current flow through thyratron 37 charges capacitor 149 through resistor 151, thereby making the suppressor grid 47 of thyratron 29 negative with respect to the cathode 45. Thyratron 29 then becomes non-conductive. Current no longer flows to capacitor 119 in the heat control circuit and thyratron 73 is maintained non-conductive by the bias voltage impressed on its capacitor 121. The voltage across capacitor 149 also biases the previously conductive thyratron 31 to non-conductivity. The thyratron 31 has charged capacitor 151 through potentiometer 153. The capacitor 152 and the potentiometer 153 constitute the Hold time-constant circuit. The capacitor 152 discharges and, at the end of a predetermined time, presents a bias low enough to allow the thyratron 63 to become conductive. The thyratron 63 then charges capacitor 155 through resistor 157. Capacitor 155, potentiometer 159 and resistor 161 constitute the Off time-constant circuit.

After momentarily closing the start switch 87, the operator has released this switch and the grids 49 of thyratron 25 and 26 are no longer connected to their cathodes 45. If the operator maintains the start switch closed removing the bias impressed on the grids 49 of thyratrons 25 and 26, the grids 47 and 49 are biased sufficiently negative to prevent the thyratrons 25 and 26 from becoming conductive immediately. The now fully charged capacitor 155 presents a bias of such magnitude and polarity that the transformer secondary 163 cannot cause thyratrons 25 and 26 to become conductive. The capacitor 95 discharges through its resistor and thyratron 28 becomes conductive, charging capacitor 89 and again biasing thyratrons 25 and 26 to non-conductivity. The circuit is then in its initial condition and will reset the sequence of timing operations.

If the repeat switch 162 is thrown from the position shown, the second control grid 49 of tube 25 is connected to the control grid 47 preventing the start thyratron 25 from becoming conductive. Thyratron 28 remains conductive and operation of the sequence control stops.

If the repeat switch 162 is in the position shown, the control grid 49 is connected to capacitor 155. Capacitor 155 maintains the thyratron 25 non-conductive for a predetermined Off period while the capacitor 155 discharges, then thyratron 25 becomes conductive charging capacitor 95 to make thyratron 28 non-conductive. When thyratron 28 becomes non-conductive, the sequence timer begins another cycle of operation.

The initiating switch 87 can be operated differently if the control switch 165 is thrown to the position not shown. After the control switch is thrown, the operator closes the start switch partly, thus connecting the grid of thyratron 26 to its cathode 45. This causes thyratron 26 to become conductive, actuating the coil 93 of the hydraulic mechanism 13 to close the welding electrodes 7 and 9. Then, if the operator desires, he can move the start switch 87 further, closing the other contacts and connecting the grid of thyratron 25 to its cathode 45. This initiates the timing operation of the welding sequence.

While we have shown and described a specific embodiment of our invention, we are aware that many modifications thereof are possible without departing from the spirit of the invention. For example, the various thyratrons of Figure 1 are illustrated as the indirectly heated type, although a number of other types of tubes would operate satisfactorily, to simplify the drawings. The heater connections are omitted from the cathodes of the valves in the heat control circuit. It, accordingly, is not our intention to limit our invention to the specific embodiment shown and described.

We claim as our invention:

1. In combination, an electric discharge valve having an anode, a cathode and a control electrode, a transformer having a primary and a secondary, said transformer secondary being connected between the control electrode and the cathode of the electric discharge valve, resistance means, a second electric valve, a source of voltage, series connections between said second electric discharge valve, said resistance means, said source of voltage, said primary of the transformer, and means for shunting said resistance means at a predetermined time.

2. In combination, an electric discharge valve having an anode, a cathode and a control electrode, a transformer having a primary and a secondary, said transformer secondary being connected between the control electrode and the cathode of the electric discharge valve, resistance means, a second electric valve, a source of voltage, series connections between said second electric discharge valve, said resistance means, said source of voltage, said primary of the transformer and electric valve means shunting said resistance means, a control electrode in said electric valve means and a variable phase shift circuit connecting said control electrode to said source of voltage in such a way that the voltage of said source controls the conductivity of said electric valve means.

3. In combination, an electric discharge valve having an anode, a cathode and a control electrode, a transformer having a primary and a secondary, said transformer secondary being connected between the control electrode and the cathode of the electric discharge valve, resistance means, a second electric valve, a source of voltage, series connections between said second electric discharge valve, said resistance means, said source of voltage, said primary of the transformer and electric valve means shunting said resistance means, an anode, a cathode and a control electrode in said electric valve means, a phase shift circuit connecting said control electrode to said source of voltage, and a variable source of direct current connected between the cathode and anode of said electric valve means, to form a variable bias therefor.

4. In combination, supply terminals; load terminals; a timer; a capacitor; connections between said supply terminals, said timer and said capacitor for supplying current to said capacitor during predetermined discrete time intervals determined by said timer; first, second and third electric discharge valves, each having an anode, a cathode, and a control electrode; connections between said capacitor and said control electrode and said cathode of said first valve; connections between said first and said second valves and said supply terminals to conduct current of one polarity from said supply terminals through said load terminals; connections between said first and said third valves and said supply terminals to conduct current of the other polarity from said supply terminals through said load terminals, and means for impressing a control voltage on the control electrodes of said second and third electric discharge valves.

5. In combination, supply terminals; load terminals, a timer; a capacitor; connections between said supply terminals, said timer and said capacitor for supplying current to said capacitor during predetermined discrete time intervals determined by said timer; first, second and third electric discharge valves, each having an anode, a cathode, and a control electrode; connections between said capacitor and said control electrode and said cathode of said first valve; connections between said first and said second valve and said supply terminals to conduct current of one polarity from said supply terminals through said load terminals; connections between said first and said third electric valves to conduct current of the other polarity from said supply terminals through said load, and a resistor connected in parallel with said second valve.

6. In combination, supply terminals; load terminals; a timer; a capacitor; connections between said supply terminals, said timer and said capacitor for supplying current to said capacitor during predetermined discrete time intervals determined by said timer; first, second and third electric discharge valves, each having an anode, a cathode, and a control electrode; connections between said capacitor and said control electrode and said cathode of said first valve; connections between said first and said second electric discharge valve and said supply terminals to conduct current of one polarity from said supply terminals through said load terminals; connections between said first and said third valves; and means for impressing on the control electrodes of said second and third valves a control voltage of a predetermined phase different from the phase of the voltage of said supply terminals.

7. In combination, supply terminals; load terminals; a timer; a capacitor; connections between said supply terminals, said timer, and said capacitor for supplying current to said capacitor during predetermined discrete time intervals determined by said timer; first, second and third electric discharge valves, each having an anode, a cathode, and a control electrode; connections between said capacitor and said control electrode and said cathode of said first valve; connections between said first and said second valve and said supply terminals to conduct current of one polarity from said supply terminals through said load terminals; connections between said first and said third valves; means for impressing on the control electrodes of said second and third valves a control voltage of a predetermined phase different from the phase of the voltage of said supply terminals; means for varying the phase of said control voltage; and means for impressing a variable unidirectional control voltage on said control electrodes of said second and third valves, said last voltage being so impressed on said control electrodes that it adds algebraically to said variable phase control voltage.

8. In combination, supply terminals; load terminals; a timer; a capacitor; connections between said supply terminals, said timer and said capacitor for supplying current to said capacitor during predetermined discrete time intervals determined by said timer; means forming with said capacitor a time constant circuit having a time constant of approximately one cycle; first, second and third electric discharge valves, each having an anode, a cathode and a control electrode; connections between said capacitor and said control electrode and said cathode of said first valve; connections between said first and said second valves and said supply terminals to conduct current of one polarity from said source through said load; connections between said first and said third valves and said supply terminals to conduct current of the other polarity from said supply terminals through said load terminals; and terminals for impressing a control voltage on the control electrodes of said second and third valves.

9. In combination valve means for controlling the flow of current from an alternating-current source through a load, a circuit connected to said valve means for rendering said valve means conductive and including means to determine the instants in each cycle of said source at which said valve means becomes conductive, a timer for measuring a predetermined period of time, said time including an electric valve controlled by said timer to conduct current for said predetermined period of time, a second electric valve in said circuit adapted to permit conduction in said circuit only when said second valve is conductive, and connections between said first and said second valve such that said first valve controls the conductivity of said second valve.

10. In combination valve means for controlling the flow of current from an alternating-current source through a load, a circuit connected to said valve means for rendering said valve means conductive and including means to determine the instants in each cycle of said source at which said valve means becomes conductive, a timer adapted to measure a predetermined period of time and including an electric valve controlled by said timer to conduct current for said predetermined period of time, a second electric valve having an anode, cathode and control electrode in said circuit adapted to permit conduction in said circuit only when said control electrode is at or above a predetermined potential with respect to said cathode, an impedance connected between said control electrode and said cathode, and a circuit between said first electric valve and said impedance.

11. In combination valve means for controlling the flow of current from an alternating-current source through a load, a circuit connected to said valve means for rendering said valve means conductive and including means to determine the instants in each cycle of said source at which said valve means becomes conductive, a timer adapted to measure a predetermined period of time and including an electric valve controlled by said timer to conduct current for said predetermined period of time, a second electric valve having an anode, cathode and control electrode in said circuit adapted to permit conduction in said circuit only when said control electrode is above a predetermined potential with respect to said cathode, energy storage impedance connected between said control electrode and said cathode, a circuit between said first electric valve and said impedance, and a circuit for substantially discharging said impedance in a time interval of one cycle.

12. A heat-control circuit including a power supply winding having terminal taps and an intermediate tap; a first electric discharge device having an anode, a cathode and a control electrode; a second electric discharge device having an anode, a cathode and a control electrode; a connection between said anode of said first device and one terminal tap; a connection between said anode of said second device and said other terminal tap; an auxiliary discharge device having an anode and a cathode; a connection between the cathodes of said first and second devices and said anode of said auxiliary device; output means; connections connecting said intermediate tap, said output means and said cathode of said auxiliary device in series; means for supplying potential between the control electrodes and the cathodes of said first and second devices adapted to render said devices conductive at predetermined instants in the periods of said supply winding and a resistor connected in parallel with said anode and cathode of at least said first device.

13. A heat-control circuit according to claim 12 characterized by a phase shift network having a pair of output terminals and by connections from each output terminal to a control electrode respectively of the first and second devices.

14. A heat-control circuit according to claim 12 characterized by a timer connected to control the conductivity of the auxiliary device.

CLARENCE B. STADUM.
EDWARD C. HARTWIG.
WILLIAM E. LARGE.

REFERENCES CITED

The following references are of record in the file of this patent:

UNITED STATES PATENTS

| Number | Name | Date |
|---|---|---|
| 2,361,846 | Garman | Oct. 31, 1944 |
| 2,406,853 | Richardson | Sept. 3, 1946 |
| 2,409,522 | Woll | Oct. 15, 1946 |
| 2,415,654 | Place | Feb. 11, 1947 |
| 2,415,870 | Ryder | Feb. 18, 1947 |
| 2,421,995 | Cooper | June 10, 1947 |
| 2,438,017 | Murcek | Mar. 16, 1948 |
| 2,463,318 | Schneider | Mar. 1, 1949 |
| 2,516,422 | Rockafellow | July 25, 1950 |